United States Patent [19]

Thiele et al.

[11] Patent Number: 5,669,386
[45] Date of Patent: Sep. 23, 1997

[54] ULTRASONIC FLOW MEASUREMENT SYSTEM EMPLOYING CROSS-CORRELATION OF BASEBAND REFLECTION DATA

[75] Inventors: Karl E. Thiele, Andover, Mass.; Richard A. Hager, Derry; David W. Clark, Windham, both of N.H.; Jerome F. Witt, Andover, Mass.

[73] Assignee: Hewlett-Packard Company, Palo Alto, Calif.

[21] Appl. No.: 692,789

[22] Filed: Jul. 31, 1996

[51] Int. Cl.⁶ ................................ A61B 8/00; A61B 8/12
[52] U.S. Cl. ................................ 128/661.08; 128/661.09; 128/660.08
[58] Field of Search ...................... 128/660.05, 660.08, 128/661.07, 661.08, 661.09, 661.1

[56] References Cited

U.S. PATENT DOCUMENTS

| | | |
|---|---|---|
| 4,622,977 | 11/1986 | Namekawa et al. . |
| 4,651,745 | 3/1987 | Namekawa et al. . |
| 4,790,323 | 12/1988 | Leavitt et al. . |
| 4,803,990 | 2/1989 | Bonnefous et al. . |
| 4,853,904 | 8/1989 | Pesque . |
| 4,928,698 | 5/1990 | Bonnefous . |
| 5,109,857 | 5/1992 | Roundhill et al. . |
| 5,383,462 | 1/1995 | Hall .................................. 128/661.08 |
| 5,386,830 | 2/1995 | Powers et al. . |
| 5,419,331 | 5/1995 | Parker et al. . |

*Primary Examiner*—Francis Jaworski
*Assistant Examiner*—Derrick Fields

[57] ABSTRACT

An ultrasound flow measurement system converts each of plural groups of reflection sample values from scatterers, into baseband complex data values and enables a velocity determination from just two lag samples. A cross correlation function derives a first cross-correlation value between a first set of complex data values that are derived at a first common sample time, during succeeding transmit events, and a second set of complex data values that are derived at a second common sample time, during succeeding transmit events. A second cross-correlation function derives a second cross-correlation value between the first set of complex data values and a third set of complex data values that are derived at the common second sample time. A local oscillator synchronizes both the baseband conversion and cross-correlation operation, and exhibits a rate of change of phase per sample time. A processor relates the rate of change of phase of the local oscillation signal, the first cross-correlation value and the second cross-correlation value to derive the velocity of the ultrasound scatterers. In particular, the first and second cross-correlation values enable establishment of a linear function defining the phase of the cross-correlation function of the complex data values. The rate of change of phase of the local oscillation signal enables establishment of a further linear function. The intersection of the two linear functions identifies the time at which a maxima occurs of the cross-correlation function, thereby enabling derivation of the velocity of the scatterers.

8 Claims, 3 Drawing Sheets

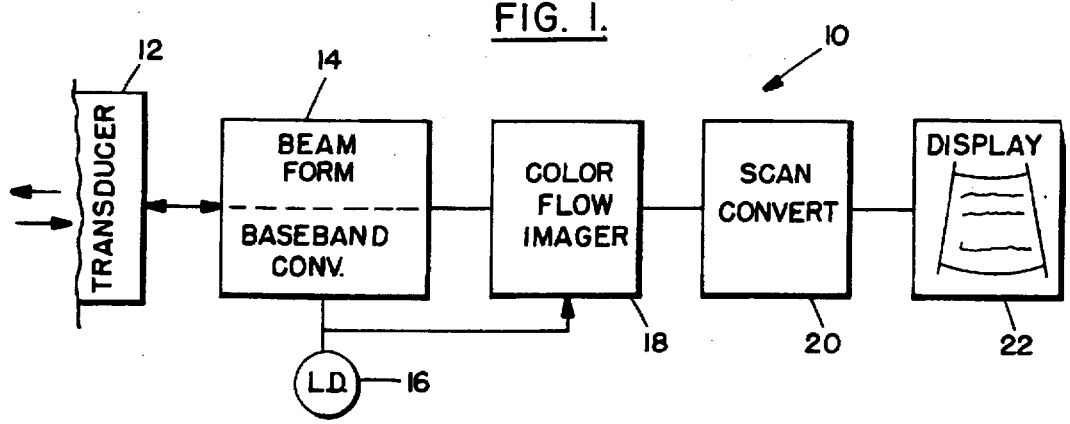
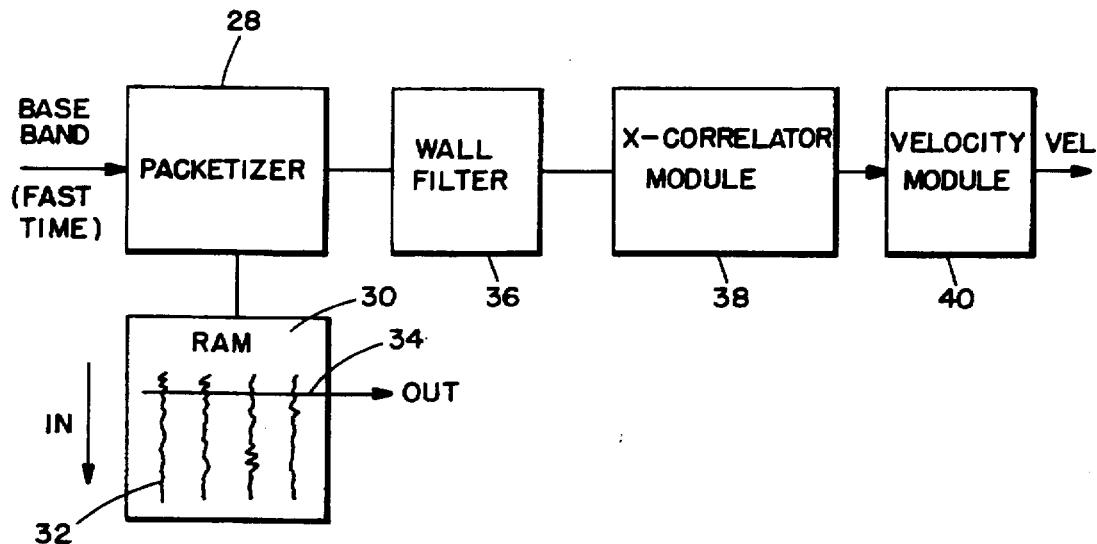
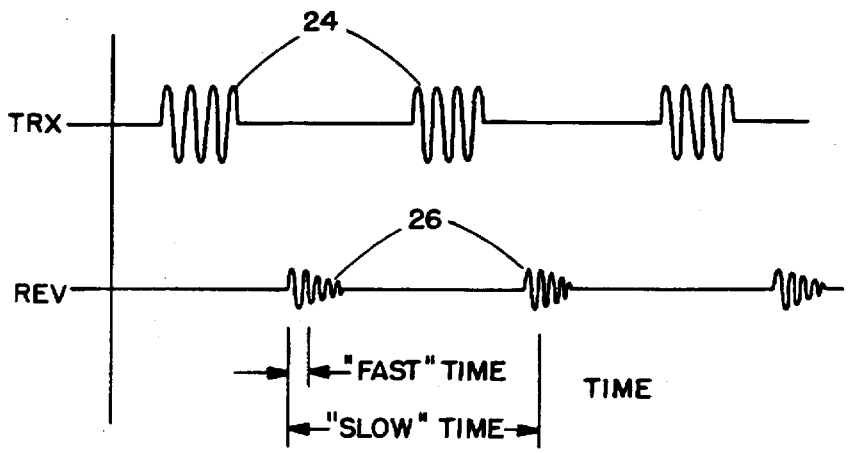

5,669,386

ULTRASONIC FLOW MEASUREMENT SYSTEM EMPLOYING CROSS-CORRELATION OF BASEBAND REFLECTION DATA

FIELD OF THE INVENTION

This invention relates generally to ultrasound color imaging of fluid flow fields or tissue motion and, in particular, to a method and apparatus for imaging of blood flow in the human body through use of cross-correlation of basebanded reflection data.

BACKGROUND OF THE INVENTION

Since the late 1970's, numerous papers and patents have been published describing means for extraction of velocity statistics from return reflections of ultrasound pulse signals. Measurement of blood flow using the Doppler shift is well known. In such systems, the frequency or time shift of the reflected waves is used to estimate the velocity of reflecting scatterers in tissue or blood. Color flow images are produced by mapping a color corresponding to the velocity onto the ultrasound image. Pulsed Doppler systems have also been used to produce 2-dimensional flow mapping in real time, using auto-correlation.

Bonnefous, in U.S. Pat. No. 4,928,698, discloses a system which measures time shifts proportional to local blood velocity, using an RF time-domain cross-correlation technique. The velocity estimate is made by finding a peak of the cross-correlation function between adjacent transmit events. The displacement of the RF correlation function peak indicates the amount of movement of the scatterers and, divided by the time between transmit events, gives the velocity of the scatterers. However, this technique requires substantial computational assets to produce real time estimates. Further, because RF time-domain signals are employed, large amounts of memory are required to store the sampled data.

In U.S. Pat. No. 5,383,462, Hall describes a technique for using quadrature baseband data to calculate the cross-correlation function. Hall reports that when data is base-banded (mixed with a local oscillator to remove carrier frequencies), reflection signals no longer look like time-shifted copies of each other, because the baseband process divides the signal into complex quadrature signals. The relative values in the real and imaginary parts are dependent on the relative phase of the incoming signal and the complex mixer signal and therefore are range dependent. More specifically, a scattered signal that may be all real during one transmit event; and will have both real and imaginary components in a next transmit event when the scatterer has moved by several range cells.

Hall compensates for this effect by using a known mixer frequency with a quadrature demodulator. If a scatterer moves exactly one range cell (i.e., one "lag"), the complex vector of its demodulated reflection signal is rotated by an angle equal to 2 π×the mixer frequency, divided by the sample rate. Thus, the data for the second transmit event is rotated back correctly, relative to the first transmit event. In order to derive sufficient data to enable a determination of flow velocity, however, the Hall system requires that ultrasound data be taken over multiple transmit events and requires that multiple lags be calculated to determine a current location of the zero crossing. The Hall system thus utilizes substantial computation assets. Nevertheless, the use of baseband data substantially reduces the amount of memory required, when compared to prior art RF cross-correlation methods.

SUMMARY OF THE INVENTION

An ultrasound flow measurement system converts each of plural groups of reflection sample values from scatterers, into baseband complex data values and enables a velocity determination from just two lag samples. A cross correlation function derives a first cross-correlation value between a first set of complex data values that are derived at a first common sample time, during succeeding transmit events, and a second set of complex data values that are derived at a second common sample time, during succeeding transmit events. A second cross-correlation function derives a second cross-correlation value between the first set of complex data values and a third set of complex data values that are derived at the common second sample time. A local oscillator synchronizes both the baseband conversion and cross-correlation operation, and exhibits a rate of change of phase per sample time. A processor relates the rate of change of phase of the local oscillation signal, the first cross-correlation value and the second cross-correlation value to derive the velocity of the ultrasound scatterers. In particular, the first and second cross-correlation values enable establishment of a linear function defining the phase of the cross-correlation function of the complex data values. The rate of change of phase of the local oscillation signal enables establishment of a further linear function. The intersection of the two linear functions identifies the time at which a maxima occurs of the cross-correlation function, thereby enabling derivation of the velocity of the scatterers.

BRIEF DESCRIPTION OF THE DRAWINGS

FIG. 1 is a high level block diagram of an ultrasonic color flow imaging system which incorporates the present invention.

FIG. 2 is a block diagram of components of a color flow imager module of FIG. 1.

FIG. 3 shows waveforms of transmit events and received reflections that are experienced in the systems of FIGS. 1 and 2.

DETAILED DESCRIPTION OF THE INVENTION

Figure 4:
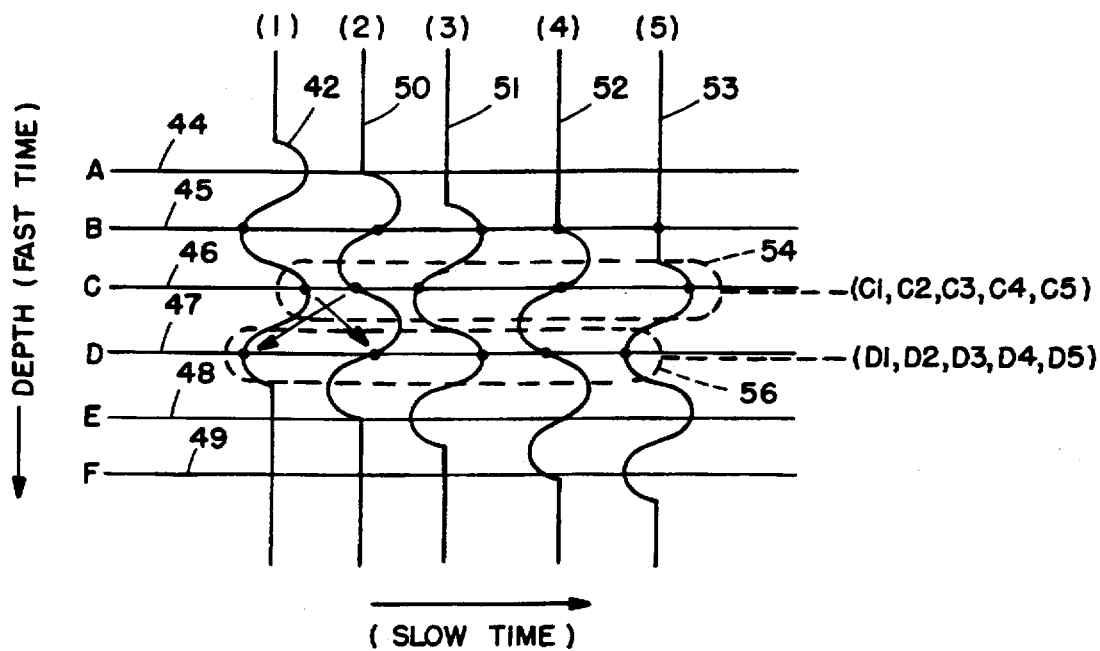
FIG. 4 is a chart showing ultrasound reflections corresponding to five succeeding transmit events, with depth sampling occurring at sample times A–F.

As above indicated, use of baseband data enables conservation of memory space and reduction of computation assets. A baseband signal is obtained by passing the real RF reflection into a quadrature mixer. Use of a typical local oscillator that outputs a complex reference signal, enables the quadrature mixer to output both real and imaginary components, describing the magnitude and phase of the RF reflection. However, the baseband signal envelope may exhibit poorly defined peaks and, as a result, be difficult to analyze, even after being subjected cross-correlation to identify the maxima of the cross-correlation function.

It has been determined, that the time of the maxima of a cross-correlated baseband signal is precisely indicated by an intersection between a line that is defined by two data points along the phase plot of the cross-correlation function and a further line which identifies the rate of change, per unit sample time, of the phase of a local oscillator. This finding is central to this invention.

Referring now to FIG. 1, an ultrasonic imaging system 10 will be described which generates a pair of cross-correlation complex values that enable a linear function which closely approximates the phase characteristic of the cross-correlation function to be established. Once that linear function is known, its intersection with a linear function defining the rate of change of phase of the local oscillator is determined, thereby enabling the time to be established at which the cross-correlation function is at a maximum for the sample data.

Ultrasonic imaging system 10 (FIG. 1) includes a transducer array 12 which, during each transmit event, produces a burst of ultrasonic energy when energized by a pulsed waveform from a transmitter (not shown). The reflected energy from the scattering field under study is converted to electrical signals and is fed to beam-forming circuit 14. Therein, the RF data is converted to baseband by being mixed with the complex output of a local oscillator 16. The baseband signals are then fed to a color flow imager 18 wherein the complex sample values are initially buffered.

Cross-correlation actions are then performed between (i) a reference set of complex sample values taken at a particular depth (across a span of plural transmit events),and (ii) both leading and lagging spans (i.e., sets) of complex sample values derived from a different depth. The results of the cross-correlation actions establish a pair of cross-correlation data values which define a pair of points on the cross-correlation phase and magnitude characteristics. A linear function derived from those values, when combined with a linear function which defines the rate of change of phase of the local oscillator, enables determination of an intersection coordinate therebetween. That coordinate identifies the maxima point of the cross-correlation function and further identifies the delay or advance experienced by a second RF reflection signal, as referenced to a first RF reflection signal, from the scatterers whose velocity is being measured.

By then determining the difference between a reference time, e.g., a zero phase point of the local oscillator signal, and the phase delay time, the velocity of the scatterers can be determined. The velocity value is mapped to a particular color, and that color is, in turn, mapped onto the ultrasound image where the scatterers are imaged. The ultrasound image is then passed to a scan convert module 20 where it is converted into an appropriate form for feeding to display 22.

FIG. 2 illustrates further details of color imager module 18, and FIG. 3 illustrates waveforms of plural transmit signals (i.e., events) 24 and reflection signals 26. As is known in the field of ultrasound, the time between corresponding points on reflection signals 26 is termed "slow time", whereas the time between samples within an individual reflection signal is termed "fast time".

In FIG. 2, baseband data, taken over plural transmit events is received into a packetizer 28 where each individual reflection signal is stored as complex data values in a random access memory 30. Conceptually, each reflection signal from a transmit event is stored "vertically" as a set of complex data values 32. During readout, however, sample data signals taken at a common fast time sample point are selected from each of reflection complex data values 32 and are read out, conceptually, in the "direction" indicated by arrow 34. In such manner, a set of reflection complex data values is derived from plural reflection returns, each set of complex data values being acquired at an identical sample time, but over plural transmit events. In such manner, phase changes between reflections occurring at a common sample time, over plural transmit times, are evidenced by different magnitudes of the reflection signals that are read out in the manner indicated by arrow 34.

When a set of complex data values, taken at a common sample time, are read out of RAM 30, they are applied to a wall filter 36 which removes any signals which have not changed value over plural transmit events (i.e., the scatterers have not moved between the transmit events). After the sets of complex data values are processed by wall filter 36, they are fed to cross-correlator module 38, the details of which will be described below in relation to FIGS. 4 and 5.

Cross-correlator module 38 enables, as described above, a pair of data points to be determined which establish a linear function approximating the cross-correlation phase characteristic. An intersection between that linear function and a linear function defining the rate of change of phase of the local oscillator signal enables identification of the time at which a maxima of the cross-correlation magnitude occurs. That time is passed to a velocity module 40 which, performs a calculation required to establish a velocity value based upon the time differential between the time of the maxima and a reference time.

Figure 5:
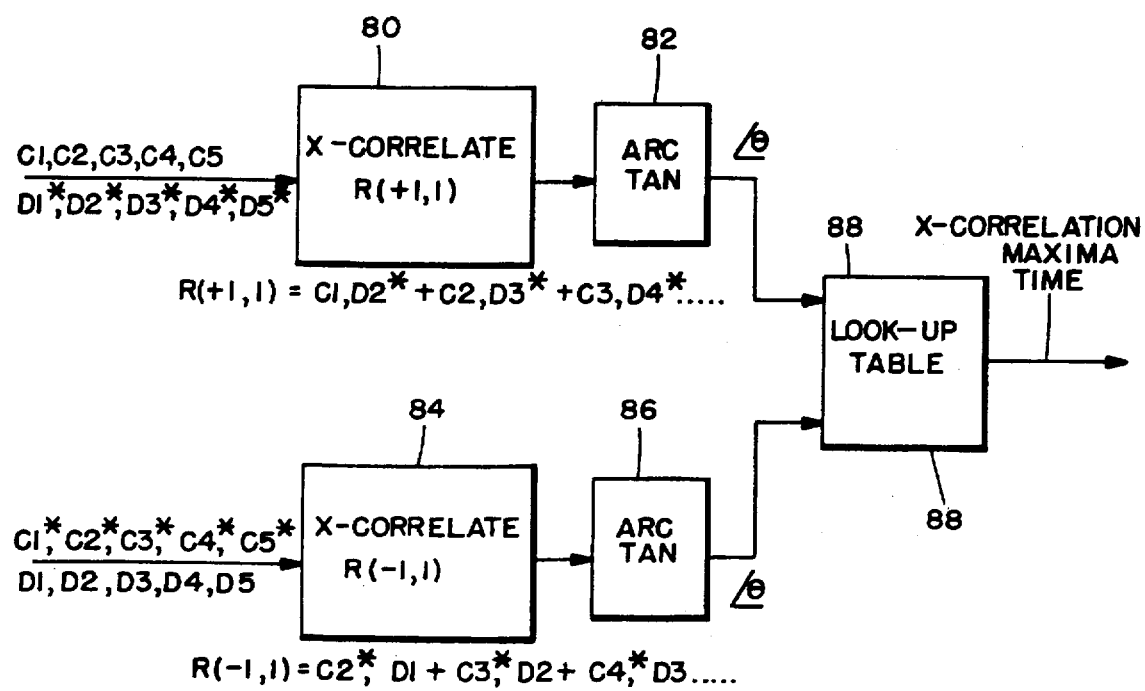
FIG. 5 is a functional block diagram illustrating the procedures and apparatus used to obtain cross-correlation values, as between common sample time, complex reflection data values, to enable determination of a baseband cross-correlation maxima time.

Turning to FIGS. 4 and 5, details of cross-correlator module 38 will be described. FIG. 4 illustrates, schematically, the form in which reflection complex data is stored in ram 30. Each of transmit events 1–5 results in receipt of a reflection signal which is mixed to baseband, sampled and stored. Thus, baseband reflection signal 42 is sampled at times A–F (during fast time) and the sampled values are stored (as evidenced by complex data values indicating phase and magnitude at intersections between waveform 42 and sample time lines 44–49). In similar fashion, each of reflection waveforms 50–53 is sampled at times A–F and the sampled values are stored.

During read-out, the stored set of complex data values encompassed by dashed line 54 are output and are indicative of phase changes occurring between reflection signals from adjacent transmit events. Since the commencement of each transmit event is coherent with the signal from local oscillator 16, the samples taken at sample time "C" (and along line 46) bear a known relationship with the phase of the output signal from local oscillator 16 (FIG. 1).

A further set of complex sample data values is encompassed by dashed line 56 and comprises sample values taken at sample time D (along line 47). The complex sample values indicated along lines 46 and 47 comprise, respectively, a set of values which defines the change in magnitude and phase of reflection signals during succeeding transmit events. The complex values along line 46 will hereafter be denoted C1, C2, C3, C4, and C5, and the sample values along line 47 will be denoted D1, D2, D3, D4 and D5.

As indicated above with respect to FIG. 2, complex sample values C1–C5 and D1–D5 are read out of RAM 30 and sets thereof are cross-correlated. More specifically, complex sample values C1–C5 are cross-correlated with sets of complex values selected from sample values D1–D5, one set being one lag ahead in time and a second set being one lag behind in time. Two cross-correlation complex values are thus obtained which enable derivation of a line approximating a portion of the phase characteristic of the cross correlation function as between C1–C5 and D1–D5.

Figure 6:
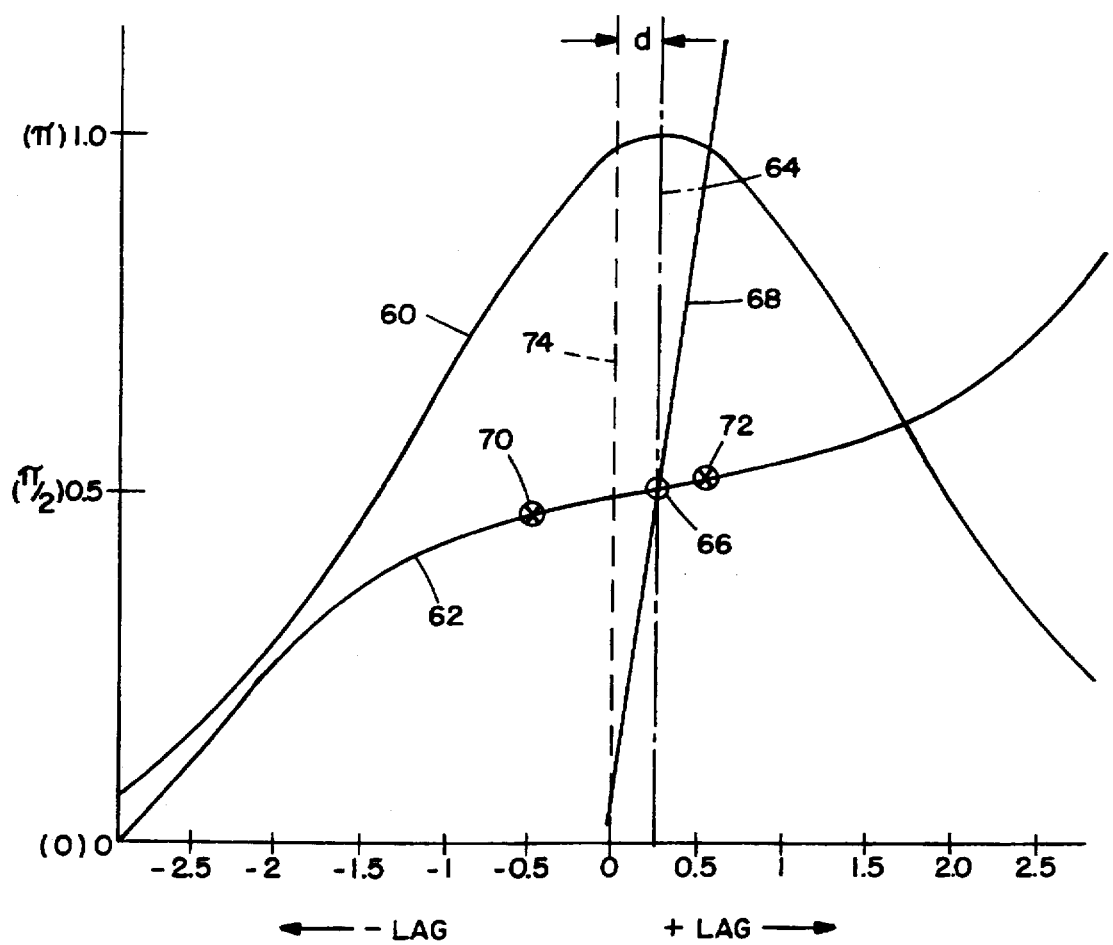
FIG. 6 is a plot of sample times (lags) versus phase, showing both the magnitude and phase of the cross-correlation function of complex data values taken over plural transmit events and a plot of rate of change of phase of the local oscillation signal. The intersection of the rate of change of oscillation signal and a line between two phase data points in the phase plot indicates the time of maxima of the cross-correlation function.

Referring to FIG. 6, if a full cross-correlation was performed between complex sample values C1–C5 and D1–D5, the resultant cross correlation magnitude function (idealized) would appear as a curve 60 in FIG. 6. In a similar fashion, the phase values resulting from the cross-correlation action would appear as phase curve 62. The horizontal axis of FIG. 6 indicates both positive and negative lags from a reference value (0), which is representative of a reference phase of the local oscillator signal. A lag is the time between transmit events and adjacent fast time samples which result therefrom. The vertical axis includes two measures, one a normalized magnitude of the cross-correlation function's magnitude and another being (for phase curve 62) angles from 0 to $\pi$).

The maxima of the magnitude of cross correlation characteristic 60 occurs at the point thereon intercepted by line 64 (or approximately +0.25 lags). The distance d between the maxima and the 0 reference phase is indicative of the phase change between succeeding reflection returns. Given the value d, the velocity of the scatterers can readily be determined, since the time T between transmit events is known. The velocity of the scatterers is calculated as d/T.

As indicated above, however, the poorly defined shape of characteristic 60, near its peak, makes it difficult to identify the maxima (and requiring the acquisition of many sample points of the baseband data to reach an accurate conclusion—using the prior art method). By contrast, Applicants have found that the point of intersection 66 between cross-correlation phase characteristic 62 and a line plot 68 which plots the change of phase of the local oscillator signal, precisely identifies the time at which the maxima occurs of cross-correlation characteristic 60 (i.e., line 64).

That fact enables substantial reduction in the amount of processing required to identify the maxima of cross-correlation characteristic 60. To identify point of intersection 66, a pair of data points 70 and 72 on cross-correlation phase characteristic 62 are determined, preferably on either side of 0 phase time 74. A straight line is assumed therebetween and its intersection with line 68 is then determined, either by calculation or via a table lookup.

Returning to FIG. 5, the procedure for identifying data points 70 and 72 on cross-correlation phase characteristic 64 will be described. In brief, sample data set C1–C5 is cross-correlated with + and − lag sets of complex sample data values D1–D5. More precisely, a first cross-correlation module 80 performs the following cross-correlation function:

$$R(+1,1) = C1, D2^* + C2, D3^* + C3 D4^* + \ldots$$

where: D2* is the complex conjugate of D2, etc.
The output of cross-correlation function 80 is then converted to an angle by arctangent module 82, that angle being point 72 on cross-correlation phase characteristic 62 (FIG. 6).

In a similar fashion, cross-correlation function 84 performs the following cross-correlation, wherein the D sample values are 1 lag behind the C sample values. Specifically, cross-correlation module 84 performs the following cross-correlation:

$$R(-1,1) = C2^* D1 + C3^* D2 + C4^* D3 + \ldots, \text{etc.}$$

The output from cross-correlation function 84 (a complex cross-correlation value) is fed to arctangent module 86 which outputs an angle value corresponding to point 70 on cross-correlation phase characteristic 62. The two values output from arctangent modules 82 and 86 are then fed to a lookup table 88.

Lookup table 88 includes precalculated lag values which are determined for each of many intersections between a line joining points 70 and 72 and local oscillator phase line 68. The intersection values can be precalculated since (i) the slope of local oscillator phase line 68 is known, given the local oscillator frequency and the time between succeeding and adjacent samples and (ii) the two input angle values enable a linear function to be derived therebetween approximating phase characteristic 62. Thus plural intersection points 66 can be precalculated in a straightforward manner and then accessed, given the input phase values.

It is to be understood that, in lieu of lookup table 88, the angle values from arctangent modules 82 and 86 could be directly passed to a microprocessor which would, in real time, calculate intersection point 66.

Once the cross-correlation maxima time is known, the phase delay of the reflection signals from the scatterers is known, the velocity thereof can be calculated and mapped to an appropriate color on the ultrasound image.

The following is a derivation which substantiates the finding that the intersection between a plot of the rate of change of phase of the local oscillation signal and the phase characteristic of a cross-correlation function identifies the maxima of the magnitude characteristic of the cross-correlation function.

A blood reflection (singular velocity) can be fully characterized by the following:

$$s(d,n) = a(d-v_o nT) \times \cos\{w_o(d-v_o nT) + \Phi(d-v_o nT)\} \quad (1)$$

where:
s received reflection (beamformed)
d fast time dimension (depth)
n slow time index
$v_o$ blood velocity (laminar)
a envelope of blood speckle pattern
T PRF interval
$w_o$ Assumed RF center frequency (used for the L.O.)
$\Phi$ Instantaneous phase of the blood speckle pattern This can be expressed as the real portion of the analytic signal:

$$s(d,n) = a(d-v_o nT) \times \text{REAL}\{e^{jw_o(d-v_o nT) + j\Phi(d-v_o nT)}\} \quad (2)$$

The baseband signal, bb is creating by mixing this signal to DC and by lowpass filtering:

signal to DC and by lowpass filtering:

$$bb(d,n) = \text{LPF}\{s(d,n) \times e^{-jw_o d}\} \quad (3)$$

$$bb(d,n) = a(d-v_o nT) \times e^{-jw_o v_o nT + j\Phi(d-v_o nT)} \quad (4)$$

Prior to summing in slow time, the cross-correlation function, R, can be calculated for some arbitrary depth ($d_o$):

$$R_{bb}(\Delta d, 1) = \sum_{d_o - RG/2}^{d_o + RG/2} bb(d,1) \times bb^*(d - \Delta d, 0) \quad (5)$$

RG refers to the range gate interval in fast time. Plugging the definition of bb into the above correlation function yields:

$$R_{bb}(\Delta d,1) = e^{-jwvT} \sum_{d_o-RG/2}^{d_o+RG/2} \{a(d-vT)a(d-\Delta d) e^{j\Phi(d-vT)-j\Phi(d-\Delta d)}\} \quad (6)$$

Note that the phase term, $-jwvT$, comes out of the summation (or integral) since it is not a function of d (fast time).

Assume that the location is known of the peak from the RF signal and that it occurs at $\Delta d = v_o T$. Evaluating the baseband correlation function at this exact fast-time lag yields:

$$R_{bb}(\Delta d = vT, 1) = e^{-jwvT} \Sigma\{a^2(d-vT)\} \quad (7)$$

Since the phase terms under the summation cancel out, the summation will only be real. Hence the phase of the baseband correlation function at the true peak location is $-jwvT$ (which is the "correct" Doppler shift). However, in order to know the peak, one needs to know the correct phase, and in order to know the correct phase, one needs to know the location of the peak. Nevertheless, this relationship will be used to define one of the constraining equations:

$$\angle R_{bb}(\Delta d = Peak) = e^{-jw_o Peak} \quad (8)$$

It is important to note that this phase relationship only holds true at the peak, and doesn't occur at other fast time lags. With respect to the proportionality constant of $w_o$, for wide band signals, as permitted by these equations, $w_o$ is no different than any other RF frequency. However, this frequency is used as the L.O. to mix the RF signal to baseband. If one looks in detail at the above equations, one can conclude that this ratio (or slope) comes directly from the L.O. frequency, and has nothing to do with the transmitted RF frequency or with the frequency of the returning RF reflection.

Next model the phase term still inside the summation at other fast time lags (other than the peak), using Equation 6:

$$\zeta = \Phi(d-vT) - \Phi(d-\Delta d) \quad (9)$$

What if it is attempted to linearize the phase response of the returning reflection at some depth?

$$\Phi(d) = -\Delta w \bullet d + \Theta(d) \quad (10)$$

This is still an exact equation, since (m) can be arbitrary. In many ways this equation can be thought of as a least mean squares (LMS) minimization problem where $-\Delta w$ is the slope of the linear line that best fits the phase response at the current depth, and where (m) models the intercept (DC phase) and the remaining LMS error. Heuristically, the line $-\Delta w \bullet d$ captures nominal frequency shifts due to attenuation and instantaneous changes in RF frequency due to blood speckle, whereas the $\Theta(d)$ term captures the higher order polynomial phase terms of the random nature of blood (with the "sloped" phase terms removed). Note that both $\Delta w$ and $\Theta(d)$ depend on the RF bandwidth, such that they will vary more rapidly in fast time for greater bandwidths.

Plugging Equation (10) into Equation (9):

$$\zeta = -\Delta w(\Delta d - vT) + [\Theta(d-vT) - \Theta(d-\Delta d)] \quad (11)$$

Obviously, this expression collapses to zero at the peak (i.e. $\Delta d = vT$). Note that the first term is no longer a function of fast time, and hence can be pulled out of the summation of Eq'n (6):

$$R_{bb}(\Delta d,1) = \quad (12)$$

$$e^{-jwvT} e^{-j\Delta w(\Delta d - vT)} \sum_{d_o-RG/2}^{d_o+RG/2} \{a(d-vT)a(d-\Delta d) e^{j\Delta\Theta(d,\Delta d,vT)}\}$$

where $\Delta(\Theta)$ is the difference terms from Eq'n 11. Equation (12) defines both the magnitude and the phase of the two correlation values that are used to estimate phase values 70 and 72 in FIG. 6.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An ultrasound system for determining velocity of movement of ultrasound scatterers in a body, comprising:

transducer means for directing ultrasound beams, at 1st through nth succeeding transmit times, respectively, at said ultrasound scatterers;

detector means for sampling return reflections, at determined sample times, from said ultrasound scatterers to derive a group of 1st through jth sample values of each return reflection;

baseband conversion means for converting each group of sample values into 1st through jth complex data values;

cross correlation means for deriving
   (i) a first cross correlation value between a first set of complex data values, each complex data value thereof derived at a first common sample time over succeeding transmit times and a second set of complex data values, each complex data value of said second set derived at a common second sample time and exhibiting a first lag of at least one transmit time from said first common sample time, and
   (ii) a second cross correlation value between said first set of complex data values and a third set of complex data values, each complex data value of said third set derived at said common second sample time, but exhibiting a second lag that is different from said first lag;

oscillator means for producing an oscillation signal for synchronizing said transducer means, detector means, baseband conversion means and cross correlation means, said oscillation signal exhibiting a rate of change of phase per determined sample time; and means for relating said rate of change of phase, said first cross correlation value and said second cross correlation value to derive said velocity of movement of said ultrasound scatterers.

2. The ultrasound system as recited in claim 1, wherein said means for relating employs said first cross correlation value and said second cross correlation value to establish a linear function, and further determines from an intersection of said linear function and a second linear function indicative of a rate of change of phase of said oscillation signal, a lag time between a reference time and a maxima of a cross correlation of said complex data values.

3. The ultrasound system as recited in claim 1, wherein said first lag is in advance of a reference phase and said second lag is retarded from said reference phase.

4. The ultrasound system as recited in claim 3, wherein said reference phase is determined from said oscillation signal.

5. A method for determining velocity of movement of ultrasound scatterers in a body, comprising the steps of:

a) directing ultrasound beams, at 1st through nth succeeding transmit times, respectively, at said ultrasound scatterers;

b) sampling return reflections, at determined sample times, from said ultrasound scatterers to derive a group of 1st through jth sample values of each return reflection;

c) converting each group of sample values into 1st through jth baseband complex data values;

d) deriving a first cross correlation value between a first set of complex data values, each complex data value thereof derived at a first common sample time over succeeding transmit times and a second set of complex data values, each complex data value of said second set derived at a common second sample time and exhibiting a first lag of at least one transmit time from said first common sample time, and e) deriving a second cross correlation value between said first set of complex data values and a third set of complex data values, each complex data value of said third set derived at said common second sample time, but exhibiting a second lag that is different from said first lag;

f) producing an oscillation synchronization signal which exhibits a rate of change of phase per determined sample time, for synchronizing steps a–e; and g) relating said rate of change of phase, said first cross correlation value and said second cross correlation value to derive said velocity of movement of said ultrasound scatterers.

6. The method as recited in claim 5, wherein step g) employs said first cross correlation value and said second cross correlation value to establish a linear function, and further determines from an intersection of said linear function and a second linear function indicative of a rate of change of phase of said oscillation signal, a lag time between a reference time and a maxima of a cross correlation of said complex data values.

7. The method as recited in claim 5, wherein said first lag in step d) is in advance of a reference phase and said second lag in step e) is retarded from said reference phase.

8. The method as recited in claim 7, wherein said reference phase is determined from said oscillation signal.

* * * * *